(12) United States Patent
Kelley et al.

(10) Patent No.: US 7,051,765 B1
(45) Date of Patent: May 30, 2006

(54) BALANCED ORIFICE PLATE

(75) Inventors: Anthony R. Kelley, Madison, AL (US); Paul D. Van Buskirk, Humble, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 192 days.

(21) Appl. No.: 10/750,628

(22) Filed: Dec. 19, 2003

(51) Int. Cl.
*F15D 1/02* (2006.01)
*G01F 1/42* (2006.01)

(52) U.S. Cl. .................... 138/44; 138/40; 73/861.61; 73/861.52

(58) Field of Classification Search .............. 138/40, 138/44, 39; 73/861.04, 861.02, 861.61, 861.52
See application file for complete search history.

(56) References Cited

U.S. PATENT DOCUMENTS

| | | | |
|---|---|---|---|
| 2,687,645 A | 8/1954 | Velten et al. ............. 138/40 X |
| 3,071,001 A | 1/1963 | Goldsmith ............... 138/40 X |
| 3,487,688 A | 1/1970 | Magliozzi ............... 73/861.52 |
| 3,521,487 A | 7/1970 | Akeley ................... 73/861.61 |
| 3,545,492 A * | 12/1970 | Scheid, Jr. .................. 138/42 |
| 3,645,298 A | 2/1972 | Roberts et al. .............. 138/40 |
| 3,750,710 A * | 8/1973 | Hayner ......................... 138/40 |
| 3,779,076 A | 12/1973 | Akeley .................... 73/861.61 |
| 3,805,612 A | 4/1974 | Shiba ....................... 73/861.61 |
| 3,838,598 A | 10/1974 | Tompkins ................ 73/861.52 |
| 4,040,293 A | 8/1977 | Wilson .................... 73/861.61 |
| 4,538,470 A | 9/1985 | Snell ........................ 73/861.61 |
| 4,557,296 A | 12/1985 | Byrne ......................... 138/44 |
| 4,961,344 A | 10/1990 | Rodder ......................... 73/202 |
| 5,086,655 A | 2/1992 | Fredericks et al. ...... 73/861.61 |
| 5,295,397 A | 3/1994 | Hall et al. ............... 73/861.02 |
| 5,297,426 A | 3/1994 | Kane et al. ................... 73/202 |
| 5,327,941 A * | 7/1994 | Bitsakis et al. .............. 138/42 |
| 5,341,848 A | 8/1994 | Laws ........................... 138/44 |
| 5,461,932 A | 10/1995 | Hall et al. ................ 138/40 X |
| 5,529,093 A | 6/1996 | Gallagher et al. ............ 138/44 |
| 6,186,179 B1 | 2/2001 | Hill ............................. 138/39 |
| 6,345,536 B1 | 2/2002 | Morrison et al. ........ 73/861.04 |
| 6,494,105 B1 | 12/2002 | Gallagher ................ 73/861.27 |

FOREIGN PATENT DOCUMENTS

| | | |
|---|---|---|
| GB | 0522708 A2 | 6/1992 |
| GB | 95/02165 | 7/1994 |
| JP | 58191922 | 11/1983 |
| JP | 63253258 | 4/1987 |

\* cited by examiner

*Primary Examiner*—Patrick Brinson
(74) *Attorney, Agent, or Firm*—James J. McGroary; Peter J. Van Bergen

(57) ABSTRACT

An orifice plate for use in a conduit through which fluid flows is defined by a central circular region having a radius $R_0$ and a ring-shaped region surrounding the central circular region. The ring-shaped region has holes formed therethrough with those holes centered at each radius R thereof satisfying a relationship $$A_R = a/(X_R V_R^b)$$

where
$A_R$ is a sum of areas of those holes having centers at radius R,
$X_R$ is a flow coefficient at radius R,
$V_R$ is a velocity of the fluid that is to flow through the conduit at radius R,
b is a constant selected to make at least one process variable (associated with the fluid that is to flow through the conduit) approximately equal at each radius R, and
a is a constant that is equal to $(X_R A_R V_R^b)$ at each radius R.

26 Claims, 4 Drawing Sheets

BALANCED ORIFICE PLATE

ORIGIN OF THE INVENTION

The invention was made in part by an employee of the United States Government and may be manufactured and used by or for the Government of the United States of America for governmental purposes without the payment of any royalties thereon or therefor.

BACKGROUND OF THE INVENTION

1. Field of the Invention

This invention relates to flow control devices. More specifically, the invention is an orifice plate that, when inserted into the cross section of a fluid flow, balances or equalizes one or more process variables associated with the flow across the surface of the plate.

2. Description of the Related Art

There are numerous applications utilizing fluid flow in a conduit where one or more process variables associated with a fluid flow (e.g., pressure, temperature, mass flow, etc.) must be modified or measured. Accordingly, a variety of orifice plates have been developed for use as flowmeters, flow controllers, flow limiters, or simply for use as flow conditioners. Flow conditioners can also be used to modify the flow in a way suitable for process variable measurements. Three prior art orifice plate designs are disclosed in U.S. Pat. Nos. 5,295,397, 5,341,848 and 5,529,093, each of which will be described briefly below.

U.S. Pat. No. 5,295,397 issued to Hall et al. discloses a slotted orifice flowmeter having an orifice plate that is transversely installed in a conduit through which a fluid flows. Uniform width and area slotted holes are arranged in concentric zones. The number of slots in a zone is proportional to the area occupied by the zone relative to the total plate area.

U.S. Pat. No. 5,341,848 issued to Laws discloses a flow conditioner (i.e., orifice plate) having a plurality of circular holes formed therethrough. The holes are arranged in a plurality of radially spaced circular arrays around a center hole. The holes in each circular array are equally spaced and are distributed around the center of the plate with all holes in any one circular array having the same diameter. The size and number of holes are such that the impedance to flow presented by the plate increases with the radius on which a given array of holes is arranged in order to match the velocity profile associated with fully developed fluid flow.

U.S. Pat. No. 5,529,093 issued to Gallagher et al. discloses a flow conditioner (i.e., orifice plate) that, similar to Laws, has a plurality of circular holes formed therethrough. The holes are arranged in zones to include a central zone and ring-shaped zones that are concentrically disposed about the central zone. Fixed ratios define hole area on a zone-to-zone basis. The goal of this design is to have a fully developed turbulence structure and velocity in the fluid.

None of the prior art teach an orifice plate designed to equalize or balance one or more process variables across the entirety of the plate's surface area. In general, the variation of a process variable across an orifice plate's surface introduces inefficiencies in a fluid flow. For example, prior art orifice plates generally experience fairly large pressure losses as a fluid flows from one side of the plate to the other. Unfortunately, the typical way of dealing with such large pressure losses is to use larger and more expensive fluid pumps. Also, pressure potential in prior art orifice plates is generally consumed by eddy turbulence that is random and chaotic. These eddy formations about the orifice plate reduce linearity and repeatability of any process variable measurements thereby causing a reduction in measurement accuracy. Reduced measurement accuracy leads to processes that are highly variable which, in turn, increases process costs due to greater equipment operational margins that must be maintained. However, if pressure can be equalized or balanced across the surface area of an orifice plate, the random and chaotic eddy formations are greatly reduced. Thus, by balancing the flow with respect to the measured process variable, the accuracy of process variable measurement is improved while the costs of taking such measurements is reduced.

SUMMARY OF THE INVENTION

Accordingly, it is an object of the present invention to provide an orifice plate for installation in a conduit where one process variable associated with a fluid flow passing through the orifice plate is balanced across the surface of the orifice plate or multiple process variables are set to an optimal balance across the surface of the orifice plate.

Other objects and advantages of the present invention will become more obvious hereinafter in the specification and drawings.

In accordance with the present invention, an orifice plate adapted to be positioned in a conduit and extend across a transverse cross-section thereof. The plate is defined by a central circular region having a radius $R_O$ and a ring-shaped region surrounding the central circular region. The ring-shaped region has a plurality of holes formed therethrough with those holes centered at each radius R of the ring-shaped region satisfying a relationship $$A_R = a/(X_R V_R^b)$$

where $A_R$ is a sum of areas of those holes having centers at radius R, $X_R$ is a flow coefficient at radius R, $V_R$ is a velocity of the fluid that is to flow through the conduit at radius R, b is a constant selected to make at least one process variable (associated with the fluid that is to flow through the conduit) approximately equal at each radius R, and a is a constant that is equal to $(X_R A_R V_R^b)$ at each radius R.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

The present invention is an improved orifice plate. As used herein, the term "orifice plate" includes any structural element (e.g., plate, disk, block, etc.) having a hole pattern formed therethrough that is to be installed in a fluid flow such that the fluid passes through the element's hole pattern. While the orifice plate can be used in a flowmeter, it could also be used simply as a flow conditioner designed to modify a fluid flow in some fashion, e.g., straighten a flow, reduce noise associated with a flow, reduce vibration associated with a flow, etc.

In terms of using the orifice plate in a flowmeter, the present invention provides for more accurate process variable measurements and reduces costs associated with running such a process. The orifice plate of the present invention reduces eddies, turbulent shear and fluid-flow stresses that otherwise contribute to pressure loss, noise, and other inefficiencies. Accordingly, the orifice plate of the present invention provides several advantages over the prior art to include improved repeatability, linearity, and reduction of pressure loss. The orifice plate is also compatible with existing fittings and current measurement systems and, therefore, does not require special piping, instrumentation, or calculation method changes.

Figure 1:
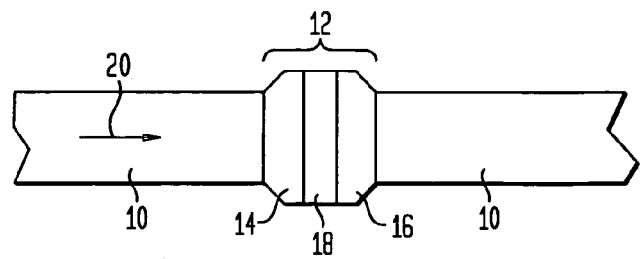
FIG. 1 is a side view of a conduit having an orifice plate installed therein in a typical installation configuration.

Referring now to the drawings, and more particularly to FIG. 1, a typical installation configuration using the orifice plate of the present invention is shown. As mentioned above, the orifice plate described herein can be used to simply condition a fluid flow or can be used as part of a flowmeter designed to measure one or more process variables associated with a fluid flow. The term "fluid" as used herein refers to any flowable substance to include vapors or gas, homogenous or non-homogenous liquids and slurries.

In FIG. 1, a conduit 10 is joined at 12 by means of flanges 14 and 16. Such conduits and joining thereof are well known in the art and are not limitations of the present invention. Fixed between flanges 14 and 16 is an orifice plate 18 that controls a flow (represented by arrow 20) of a fluid moving through conduit 10. Orifice plate 18 is thus positioned in flow 20 and is typically transverse or perpendicular to flow 20 as is known in the art.

Figure 2A:
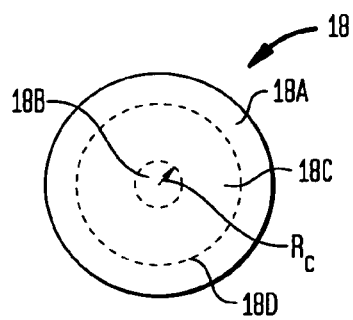
FIG. 2A is a planar view of an embodiment of an orifice plate in accordance with the present invention illustrating the general construction thereof for use in a conduit having a circular cross-section.
Figure 2B:
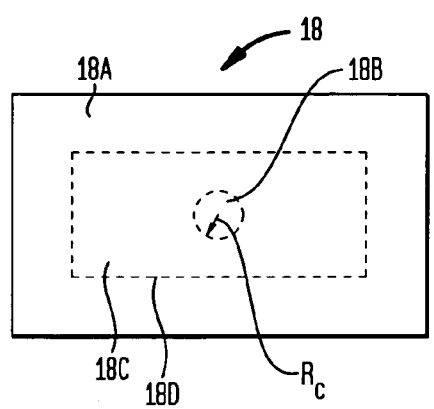
FIG. 2B is a planar view of another embodiment of an orifice plate of the present invention illustrating the general construction thereof for use in a conduit having a rectangular cross-section.

Orifice plate 18 can be sized/shaped to work with any size/shape of conduit 10. For example, as shown in FIG. 2A, orifice plate 18 can be circular for installation in a cylindrical conduit. FIG. 2B illustrates that orifice plate 18 could be rectangular for installation in a rectangular conduit. In either case, orifice plate 18 includes a peripheral mounting region 18A that is captured between flanges 14 and 16. Each orifice plate 18 also has a central circular region 18B having a radius $R_c$, and a balanced flow region 18C that starts at the perimeter of central circular region 18B and ends at a perimeter defined by dashed lines 18D. Perimeter 18D is commensurate with the inner boundary of conduit 10. The present invention's through-hole area-distribution (not shown in FIGS. 2A and 2B) is formed in balanced flow region 18C.

Figure 2C:
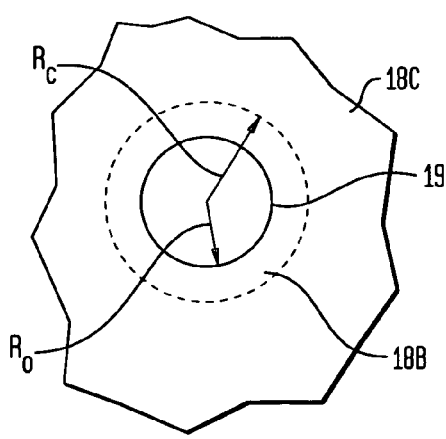
FIG. 2C is an enlarged planar view of a portion of an orifice plate of the present invention illustrating a single hole in the plate's central circular region.
Figure 2D:
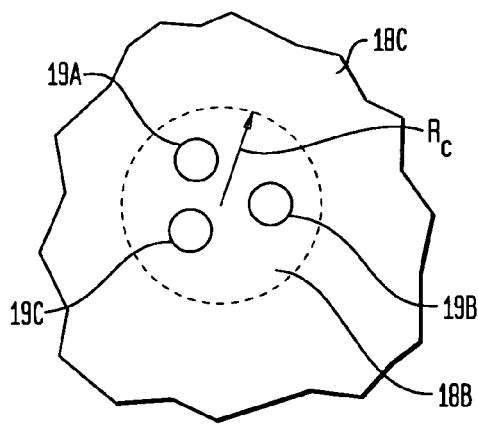
FIG. 2D is an enlarged planar view of a portion of an orifice plate of the present invention illustrating multiple holes in the plate's central circular region.

The configuration of central circular region 18B is not a limitation of the present invention. Accordingly, central circular region 18B can be solid (i.e., no holes) as illustrated in FIGS. 2A and 2B. However, central circular region 18B can also have a single hole 19 of radius $R_0$, where $R_0 \leq R_c$, formed therethrough as shown in FIG. 2C. Still further, central circular region 18B can have multiple holes (e.g., holes 19A, 19B and 19C) formed therethrough as shown in FIG. 2D.

In accordance with the present invention, an orifice plate's through-hole area-distribution for balanced flow region 18C follows or satisfies the general relationship $$A_R = a/(X_R V_R^b) \qquad (1)$$

where, in general, $A_R$ is the sum of hole areas referenced to a radius R originating at the center of central circular region 18B and terminating within balanced flow region 18C;

$X_R$ is a flow coefficient at radius R that is equal to $(\rho K)_R$ where $\rho_R$ is a density of a fluid that is to flow through conduit 10 at radius R, and $K_R$ is a flow correction factor associated with one of the fluid's momentum, kinetic energy, energy density, volumetric flow, mass flow, etc., for the fluid that is to flow through conduit 10 at radius R, $V_R$ is a velocity of the fluid that is to flow through conduit 10 at radius R where the velocity follows a known distribution function that is based upon factors to include the particular fluid at issue, conduit size/shape, etc., as is known in the art, b is a constant selected to make at least one process variable (that is associated with the fluid that is to flow through conduit 10) equal or "balanced" at each radius R where b can be any value, but typically ranges from −5 to +5 (e.g., b typically is 1 when balancing mass, b is typically 2 when balancing momentum or velocity head although a different flow correction factor K may be used in each case, etc.), and a is a constant that is equal to $(X_R A_R V_R^b)$ at each radius R.

Based on the velocity of the fluid flow, the flow coefficient $X_R$ can be a constant or can vary across the surface of the orifice plate. Specifically, the $X_R$ factor is variable when the change in the $X_R$ product (i.e., $(\rho K)_R$) varies by more than some prescribed upper limit across the different regions of the orifice plate.

For cases where only one process variable is of concern, the constant b is selected to equalize or balance the process variable at each radius of the orifice plate. For cases where more than one process variable is of concern, the value for b is selected such that the equalization or balancing of the process variables across the balanced flow region of the orifice plate is optimized for the process variables of concern. That is, compromises may be made in terms of an individual process variable's absolute equalization in order to optimize the balancing of all the process variables of concern. As a result, the balancing of multiple process variables in accordance with the present invention will generally achieve an approximate equalization of each process variable across the balanced flow region of the orifice plate.

The sum of hole areas $A_R$ is defined differently depending on the structure of the hole pattern which, in general falls into two different categories. The first category refers to holes (e.g., circular holes, slotted holes in the shape of an arc of a circle) having their centers located on a radius R. That is, the holes are discrete holes formed in balanced flow region 18C. The second category refers to the area of all holes that are defined just at a radius R where each such hole extends continuously from the perimeter of central circular region 18B to perimeter 18D. Examples of each category will be provided herein.

Regardless of the category of hole pattern structure, the ratio of total orifice flow area $A_{Total}$ provided by orifice plate 18 to the conduit's flow area $A_{pipe}$ may be determined from the following well known orifice equations, $$A_{Total}/A_{pipe} = (1+Q)^{-1/2} \quad (2)$$

and $$Q = 2G_c \rho \Delta P (C_o Y A_{pipe}/M)^2 \quad (3)$$

where
$G_c$ is Newton's conversion constant,
$\rho$ is the fluid density,
$\Delta P$ is the differential pressure measured across the orifice plate,
$C_o$ is the orifice plate coefficient,
Y is an expansion factor typically applied to compressible fluids, and
M is the mass flow rate.

Equations (2) and (3) are straightforward derivations from the orifice meter equations described in detail by McCabe et al. in "Unit Operations of Chemical Engineering, Fifth Edition," McGraw-Hill, Inc., New York, 1983, p. 222, the contents of which are hereby incorporated by reference.

Using the total orifice flow area $A_{TOTAL}$, the sum of the orifice areas of balanced flow region 18C is specified by $$A_{TOTAL} - A_{RO} = A_{R1} + A_{R2} + \ldots + A_{Rn} \quad (4)$$

where
$A_{RO}$ is (i) zero when there is no hole in central circular region 18B, (ii) $2\pi R_0$ when there is a single hole of radius $R_0$ in central circular region 18B, and (iii) the sum of all areas associated with multiple holes in center circular region 18B. A single hole in central circular region 18B can have any radius up to and including $R_0$. The presence or absence of a hole or holes in circular central region 18B is not a limitation of the present invention.

Figure 3A:
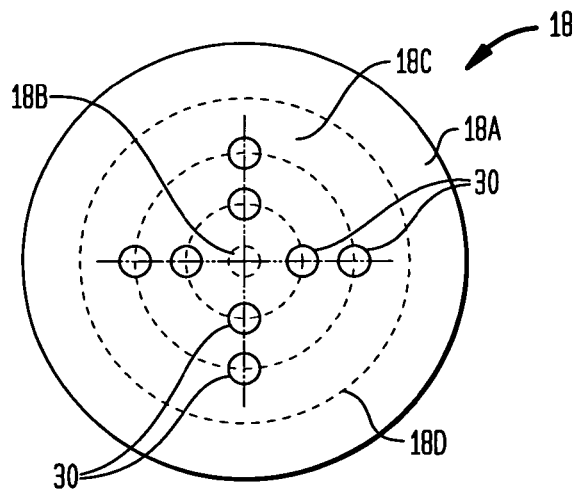
FIG. 3A is a planar view of one embodiment of an orifice plate according to the present invention having discrete circular holes that are radially aligned in the plate's balanced flow region.
Figure 3B:
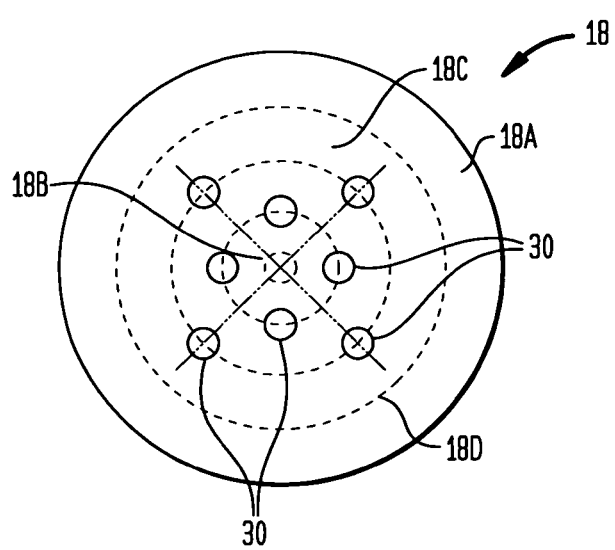
FIG. 3B is a planar view of another embodiment of an orifice plate according to the present invention having discrete circular holes that are radially misaligned in the plate's balanced flow region.
Figure 3C:
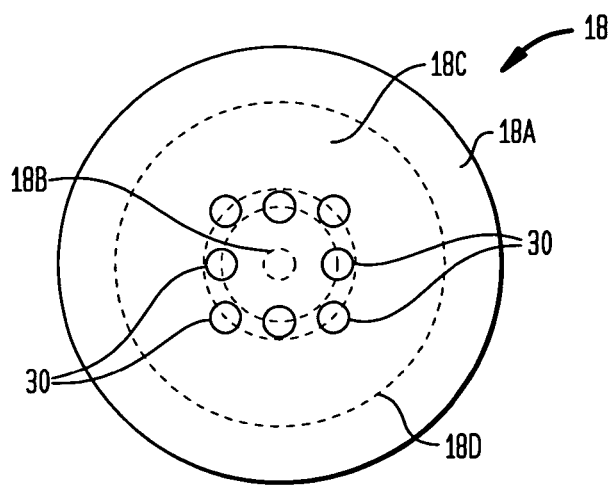
FIG. 3C is a planar view of yet another embodiment of an orifice plate according to the present invention having discrete circular holes where the holes on one radius partially overlap the holes of an adjacent radius in the plate's balanced flow region.

FIGS. 3A–3C depict, in general, examples of orifice plates having hole pattern structures in balanced flow region 18C in accordance with the first category described above. That is, the examples are not necessarily representative of specific examples, but rather are illustrative of general hole positioning on a radius-to-radius basis. Each of these examples is based on the use of circular holes 30. The diameters of the holes on a particular radius are the same, but need not be the same provided the constraints defined in equation (1) are satisfied. In general, there could be any number of shape of holes provided equation (1) is satisfied. By way of example, the diameter $D_i$ for uniform circular discrete holes centered on a given plate radius $R_i$ can be determined by the following relationship $$D_i = 2(A_{Ri}/N\pi)^{1/2} \quad (5)$$

where
$A_{Ri}$ is the area of all holes centered on radius $R_i$, and
N is the preferred number of holes to be centered on radius $R_i$.

In FIG. 3A, the centers of holes 30 on each radius R are aligned with the centers of holes 30 of the other radii. In FIG. 3B, the centers of the holes 30 on each radius R are misaligned with respect to the centers of holes on adjacent radii. In each of FIGS. 3A and 3B, there is no overlap between holes centered on adjacent radii. However, in FIG. 3C, there is some overlap between holes 30 centered on adjacent radii.

Figure 4:
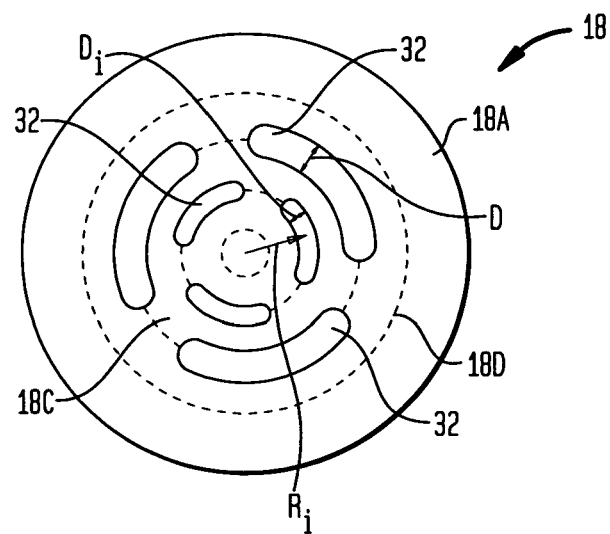
FIG. 4 is a planar view of another embodiment of an orifice plate according to the present invention having discrete arc-shaped slots in the plate's balanced flow region.

FIG. 4 illustrates another example of a discrete hole, first category type of hole pattern structure where each hole in an arc-shaped slot 32 centered on a radius R. By way of example, each slot 32 has rounded (i.e., half circle) ends having a circular diameter D and a slot width of D. For a slot 32 centered on a radius $R_i$, the slot width $D_i$ is determined as follows $$D_i = (-\alpha R_i/90) + \{(32400 * A_{Ri} + \alpha^2 R_i^2 \pi S)/(8100 \pi S)\}^{1/2} \quad (6)$$

where
$\alpha = 360/2S$,
S is the number of slots on a given radius $R_i$, and
$A_{Ri}$ is the combined area of all the slots centered on radius $R_i$.

The slots on a given radius can be equally or unequally spaced without departing from the scope of the present invention. Similar to the circular hole examples described above, slots on adjacent radii can be aligned or misaligned. Still further, the slots can be of different sizes or shapes provided they satisfy equation (1) above.

Figure 5A:
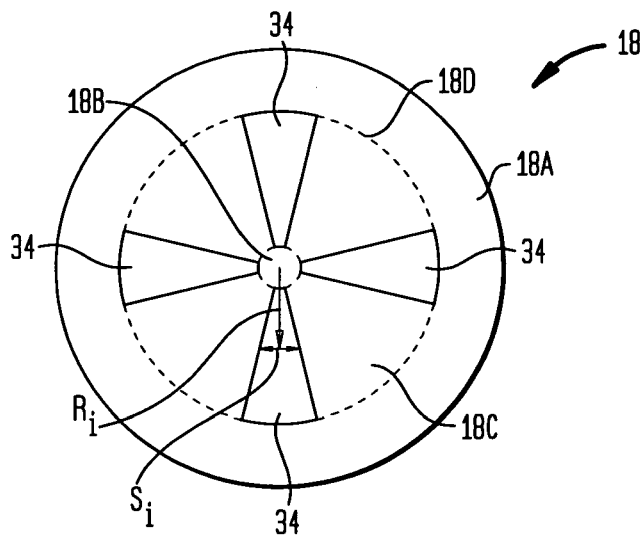
FIG. 5A is a planar view of one embodiment of an orifice plate according to the present invention having V-shaped holes that extend continuously across the plate's balanced flow region.
Figure 5B:
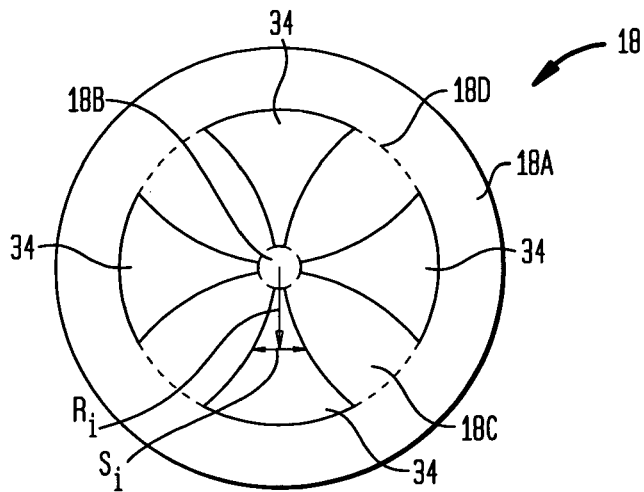
FIG. 5B is a planar view of another embodiment of an orifice plate according to the present invention having geometrically expanding holes that extend continuously across the plate's balanced flow region.

FIGS. 5A and 5B illustrate examples of orifice plates having hole pattern structures in balance flow region 18C in accordance with the above-described second category of each structures. Accordingly, each of the examples is based on the use of holes that extend continuously from central circular region 18B out to positions that are at or near perimeter 18D of balanced flow region 18C. Once again, the examples are not necessarily representative of specific examples, but rather are illustrative of general hole shape/positioning. For each example, each of holes 34 increases in area with increases in radial distance from central circular region 18B. For each example, the radian angle $S_i$ at a radius $R_i$ can be determined from the following relationship $$S_i = \{A_{Ri}/(2R_i + \Delta R) + A_{(Ri+1)}/(2R_{(i+1)} + \Delta R)\}/2N\Delta R \quad (7)$$

where $\Delta R$ is the change in radial distance from $R_i$ to $R_{i+1}$, and

N is the preferred number of holes 34 to be formed in orifice plate 18. It is to be understood that other approaches can be used to determine radian angle $S_i$ without departing from the scope of the present invention. In FIG. 5A, holes 34 are V-shaped while holes 34 expand geometrically in the embodiment shown in FIG. 5B.

As mentioned above, the orifice plate of the present invention can be used "as is" to simply condition a flow. However, the orifice plate can also be "instrumented" with one or more sensors for measuring process variables across the orifice plate. That is, radially-extending holes can be drilled into the orifice plate to a hole that is to be instrumented with a sensor of choice which will be mounted flush with the sidewall of a hole. In this way, measurement hardware is kept completely out of the flow field. Note that traditional measurement schemes can also be used where measurements are made upstream and downstream of the orifice plate.

Figure 6A:
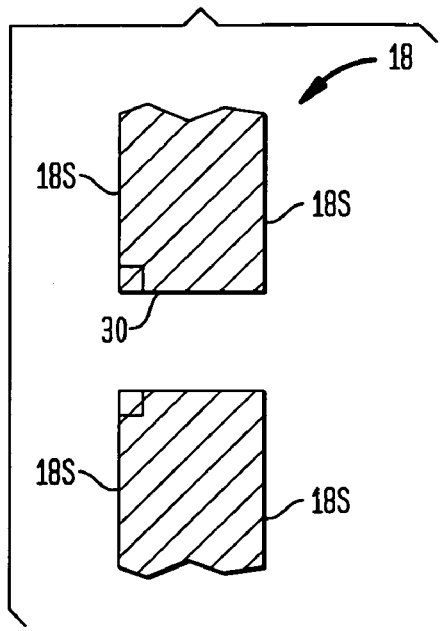
FIG. 6A is a cross-sectional view of a portion of an orifice plate illustrating a hole-to-plate surface interface that forms a right angle.
Figure 6B:
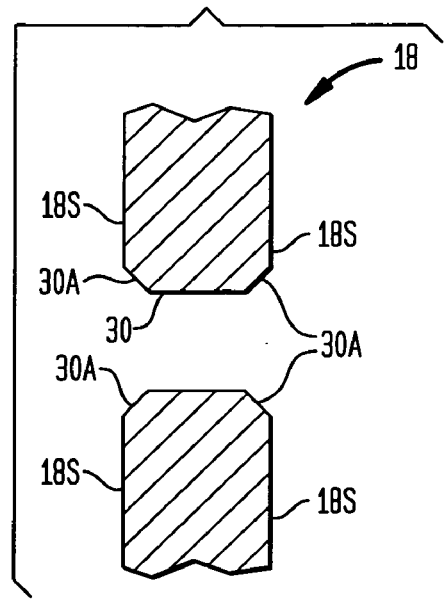
FIG. 6B is a cross-sectional view of a portion of another orifice plate illustrating a hole-to-plate surface interface that is beveled.

Regardless of the hole shape or size, the hole-to-plate surface interface can be sharply defined by a right angle as shown in FIG. 6A where a portion of an orifice plate 18 is shown with the plate's surfaces referenced at 18S and hole 30 cut therethrough. However, each hole-to-plate surface interface could also be beveled at 30A as shown in FIG. 6B. Such beveling could be formed at one or both (as shown) surfaces 18S.

Figure 7:
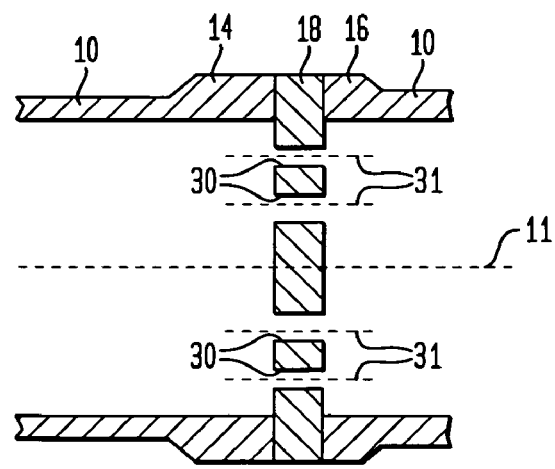
FIG. 7 is a cross-sectional view of an orifice plate in which its holes are aligned parallel to the conduit's longitudinal axis.

In addition, a hole's longitudinal axis (in the case of first category discrete holes) or through-the-hole axis (in the case of second category continuous holes) are typically parallel to the conduit's longitudinal axis. For example, FIG. 7 illustrates holes 30 having a longitudinal axis 31 that is parallel to a longitudinal axis 11 of conduit 10.

The advantages of the present invention are numerous. The holes in the orifice plate are easily sized and distributed in a variety of ways to balance (across the balance flow region of the plate) process variable(s) associated with a fluid flow. When compared with traditional orifice plates, the benefits of the present invention include improved measurement accuracy, better pressure recovery and lower noise generation. Further, the present invention provides a reduced permanent pressure loss from one side of the plate to the other side of the plate. As a result, fluids pumped through the orifice plate of the present invention require less pump energy as compared to prior art orifice plates. The present invention can be designed for and used in a wide variety of fluid flow applications.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An orifice plate comprising:
   a plate adapted to be positioned in a conduit and extend across a transverse cross-section thereof, said plate defined by a central circular region having a radius $R_c$ and a ring-shaped region surrounding said central circular region,
   said ring-shaped region having a plurality of holes formed therethrough with ones of said plurality of holes centered at each radius R of said ring-shaped region satisfying a radius-independent, flow-based relationship $$A_R = a/(X_R V_R^b)$$

where
   $A_R$ is a sum of areas of said ones of said plurality of holes having centers at said radius R,
   $X_R$ is a flow coefficient at said radius R that is equal to $(\rho K)_R$ where $\rho_R$ is a density of a fluid that is to flow through the conduit at said radius R and $K_R$ is a flow correction factor associated with the fluid that is to flow through the conduit at said radius R,
   $V_R$ is a velocity of the fluid that is to flow through the conduit at said radius R,
   b is a constant selected to make at least one process variable, associated with the fluid that is to flow through the conduit, approximately equal at each said radius R, and
   a is a constant that is equal to $(X_R A_R V_R^b)$ at each said radius R.

2. An orifice plate as in claim 1 wherein each of said plurality of holes is beveled at each surface of said plate.

3. An orifice plate as in claim 1 wherein each of said plurality of holes has a longitudinal axis that is parallel to a longitudinal axis of the conduit.

4. An orifice plate as in claim 1 wherein said central circular region has at least one circular hole formed therethrough.

5. An orifice plate as in claim 4 wherein said at least one circular hole comprises a single circular hole having a radius $R_0$ wherein $R_0 \geq R_c$.

6. An orifice plate as in claim 1 wherein each of said plurality of holes is circular.

7. An orifice plate as in claim 1 wherein each of said plurality of holes is an arc-shaped slot.

8. An orifice plate comprising:
   a plate adapted to be fixedly positioned in a conduit and extend across a transverse cross-section thereof that is circular, said plate defined by a central circular region having a radius $R_c$ and a ring-shaped region surrounding said central circular region, said ring-shaped region having an inner radius $R_{in} = R_c$ and an outer radius $R_{out}$,
   said ring-shaped region having a plurality of holes formed therethrough with ones of said plurality of holes centered at each radius R, $R_{in} < R < R_{out}$, of said ring-shaped region satisfying a radius-independent, flow-based relationship $$A_R = a/(X_R V_R^b)$$

where
   $A_R$ is a sum of areas of said ones of said plurality of holes having centers at said radius R, $X_R$ is a flow coefficient at said radius R that is equal to $(\rho K)_R$ where $\rho_R$ is a density of a fluid that is to flow through the conduit at said radius R and $K_R$ is a flow correction factor associated with the fluid that is to flow through the conduit at said radius R, $V_R$ is a velocity of the fluid that is to flow through the conduit at said radius R, b is a constant selected to make at least one process variable, associated with the fluid that is to flow through the conduit, approximately equal at each said radius R, and a is a constant that is equal to $(X_R A_R V_R^b)$ at each said radius R.

9. An orifice plate as in claim 8 wherein each of said plurality of holes is beveled at each surface of said plate.

10. An orifice plate as in claim 8 wherein each of said plurality of holes has a longitudinal axis that is parallel to a longitudinal axis of the conduit.

11. An orifice plate as in claim 8 wherein said central circular region has at least one circular hole formed therethrough.

12. An orifice plate as in claim 11 wherein said at least one circular hole comprises a single circular hole having a radius $R_0$ wherein $R_0 \leq R_c$.

13. An orifice plate as in claim 8 wherein each of said plurality of holes is circular.

14. An orifice plate as in claim 8 wherein each of said plurality of holes is an arc-shaped slot.

15. An orifice plate comprising:

a plate adapted to be positioned in a conduit and extend across a transverse cross-section thereof, said plate defined by a central circular region having a radius $R_c$ and a ring-shaped region surrounding said central circular region, said ring-shaped region having a plurality of holes formed therethrough with said plurality of holes at each radius R of said ring-shaped region satisfying a radius-independent, flow-based relationship $$A_R = a/(X_R V_R^b)$$

where $A_R$ is a sum of areas defined by said plurality of holes at said radius R, $X_R$ is a flow coefficient at said radius R that is equal to $(\rho K)_R$ where $\rho_R$ is a density of a fluid that is to flow through the conduit at said radius R and $K_R$ is a flow correction factor associated with the fluid that is to flow through the conduit at said radius R, $V_R$ is a velocity of the fluid that is to flow through the conduit at said radius R, b is a constant selected to make at least one process variable, associated with the fluid that is to flow through the conduit, approximately equal at each said radius R, and a is a constant that is equal to $(X_R A_R V_R^b)$ at each said radius R.

16. An orifice plate as in claim 15 wherein each of said plurality of holes is beveled at each surface of said plate.

17. An orifice plate as in claim 15 wherein each of said plurality of holes has an axis extending through said plate that is parallel to a longitudinal axis of the conduit.

18. An orifice plate as in claim 15 wherein said central circular region has at least one circular hole formed therethrough.

19. An orifice plate as in claim 18 wherein said at least one circular hole comprises a single circular hole having a radius $R_0$ wherein $R_0 \leq R_c$.

20. An orifice plate as in claim 15 wherein each of said plurality of holes extends continuously from said radius $R_c$, and wherein each of said plurality of holes increases in area with increases in said radius R.

21. An orifice plate comprising:

a plate adapted to be fixedly positioned in a conduit and extend across a transverse cross-section thereof that is circular, said plate defined by a central circular region having a radius $R_c$ and a ring-shaped region surrounding said central circular region, said ring-shaped region having an inner radius $R_{in} = R_c$ and an outer radius $R_{out}$, said ring-shaped region having a plurality of holes formed therethrough with said plurality of holes at each radius R, $R_{in} < R < R_{out}$, of said ring-shaped region satisfying a radius-independent, flow-based relationship $$A_R = a/(X_R V_R^b)$$

where $A_R$ is a sum of areas defined by said plurality of holes at said radius R, $X_R$ is a flow coefficient at said radius R that is equal to $(\rho K)_R$ where $\rho_R$ is a density of a fluid that is to flow through the conduit at said radius R and $K_R$ is a flow correction factor associated with the fluid that is to flow through the conduit at said radius R, $V_R$ is a velocity of the fluid that is to flow through the conduit at said radius R, b is a constant selected to make at least one process variable, associated with the fluid that is to flow through the conduit, approximately equal at each said radius R, and a is a constant that is equal to $(X_R A_R V_R^b)$ at each said radius R.

22. An orifice plate as in claim 21 wherein each of said plurality of holes is beveled at each surface of said plate.

23. An orifice plate as in claim 21 wherein each of said plurality of holes has an axis extending through said plate that is parallel to a longitudinal axis of the conduit.

24. An orifice plate as in claim 21 wherein said central circular region has at least one circular hole formed therethrough.

25. An orifice plate as in claim 24 wherein said at least one circular hole comprises a single circular hole having a radius $R_0$ wherein $R_0 \leq R_c$.

26. An orifice plate as in claim 21 wherein each of said plurality of holes extends continuously from said radius $R_c$, and wherein each of said plurality of holes increases in area with increases in said radius R.

* * * * *